(12) United States Patent  
Joler et al.

(10) Patent No.: US 7,445,261 B2
(45) Date of Patent: Nov. 4, 2008

(54) CONSOLE ASSEMBLY FOR A VEHICLE

(75) Inventors: Jerome David Joler, Rochester Hills, MI (US); Jason Gamache, Romeo, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 385 days.

(21) Appl. No.: 11/275,386

(22) Filed: Dec. 29, 2005

(65) Prior Publication Data

US 2007/0152461 A1 Jul. 5, 2007

(51) Int. Cl.
*B60N 3/12* (2006.01)
(52) U.S. Cl. .................................. 296/24.34
(58) Field of Classification Search ............. 296/24.34, 296/24.3, 24.4, 37.1, 37.8, 37.9, 37.14
See application file for complete search history.

(56) References Cited

U.S. PATENT DOCUMENTS

| 3,356,409 | A | * | 12/1967 | Belsky et al. ............ 296/24.34 |
| 4,809,897 | A | * | 3/1989 | Wright, Jr. ................... 224/282 |
| 5,397,160 | A | * | 3/1995 | Landry ........................ 296/37.8 |
| 5,893,603 | A | * | 4/1999 | Viertel et al. ................ 296/214 |
| 6,135,529 | A | | 10/2000 | DeAngelis et al. |
| 6,419,314 | B1 | * | 7/2002 | Scheerhorn ............ 297/188.19 |
| 6,644,526 | B2 | | 11/2003 | Pregorier |
| 6,726,267 | B2 | | 4/2004 | Kim et al. |
| 6,869,121 | B2 | | 3/2005 | Kayumi et al. |
| 6,921,118 | B2 | | 7/2005 | Clark et al. |
| 6,932,402 | B2 | * | 8/2005 | Niwa et al. ............... 296/24.34 |
| 2003/0107228 | A1 | * | 6/2003 | Ono et al. .................. 296/24.1 |
| 2003/0122392 | A1 | | 7/2003 | Larsen et al. |
| 2003/0155786 | A1 | | 8/2003 | Kim et al. |
| 2003/0234550 | A1 | | 12/2003 | Brooks et al. |

* cited by examiner

*Primary Examiner*—H Gutman
(74) *Attorney, Agent, or Firm*—Brooks Kushman P.C.

(57) ABSTRACT

A console assembly configured for use in a passenger seating of a vehicle includes a lower console module extending generally horizontally adjacent a floor of the passenger seating area and an upper console module disposed adjacent and operatively connected to the lower console module. The upper console module is adjustable between at least a first position adjacent a top surface of the lower console module and a second position adjacent a rear surface of the lower console module.

20 Claims, 3 Drawing Sheets

CONSOLE ASSEMBLY FOR A VEHICLE

BACKGROUND OF THE INVENTION

1. Field of the Invention

The present invention relates generally to a console assembly for a passenger seating area of a vehicle.

2. Background Art

Vehicle manufacturers continue to develop storage containers and devices for the passenger compartments of vehicles to accommodate occupant's personal items and automotive components. Several current storage containers are designed to fit within specified areas of the passenger compartment and allow limited access to items stored therein.

Many automotive vehicles include a center console or other storage device disposed between the driver and passenger seats in the front passenger compartment of the vehicle. These consoles typically comprise a console base either secured to the floor or pivotally connected between the seats, a storage cavity formed in the console base to retain items during travel and an armrest pivotally connected to the console base extending generally horizontally across the storage cavity.

Armrests are incorporated into vehicles for ergonomic reasons and comfort and convenience of both drivers and passengers. Armrests may be attached to or integrally formed as part of an interior door panel, a seat assembly, an overhead console, a center console, an instrument panel, a floor system, or any other interior panel.

It is desirable to make console assemblies reconfigurable by integrating various components in a storage area below an armrest. However, many of these components are limited in use to passengers seated in distinct positions of the passenger seating area. It would be advantageous to provide a console assembly having a reconfigurable component usable throughout the vehicle seating area. It would also be advantageous to provide a storage console assembly for a vehicle which offers a wide variety of storage options while allowing access to items stored therein to most occupants of the vehicle.

SUMMARY OF THE INVENTION

The present invention provides a console assembly disposed between a pair of passenger seats in a passenger seating area. The console assembly comprises a console assembly configured for use in a passenger seating of a vehicle includes a lower console module extending generally horizontally adjacent a floor of the passenger seating area and an upper console module disposed adjacent and operatively connected to the lower console module. The upper console module is adjustable between at least a first position adjacent a top surface of the lower console module and a second position adjacent a rear surface of the lower console module.

In another aspect of the present invention, a console assembly is disposed between a pair of front passenger seats adjacent a rear portion of a passenger seating area. The console assembly includes a lower console module extending generally horizontally between the pair of front passengers seats having a base securable to a floor of the passenger seating area, a front surface, a rear surface and opposing side surfaces extending between the front and rear surfaces. The lower console module includes one or more channels formed therein and one or more storage compartments accessible through the opening in a top surface of the lower console module.

An upper console module is disposed adjacent and operatively connected to the lower console module through the one or more channels in the lower console module. The upper console module includes an armrest pivotally connected to and extending at least partially over a storage compartment formed in the upper console module. The upper console module is adjustable between one or more generally horizontal positions disposed adjacent a top surface of the lower console module and a generally vertical position disposed adjacent a rear surface of the lower console module such that the upper console module is accessible to the rear passenger seating area when moved to the generally vertical position.

Other features and advantages of the present invention will be readily appreciated and better understood after reading the subsequent description when considered in connection with the accompanying drawings.

DETAILED DESCRIPTION OF THE PREFERRED EMBODIMENT(S)

Figure 1:
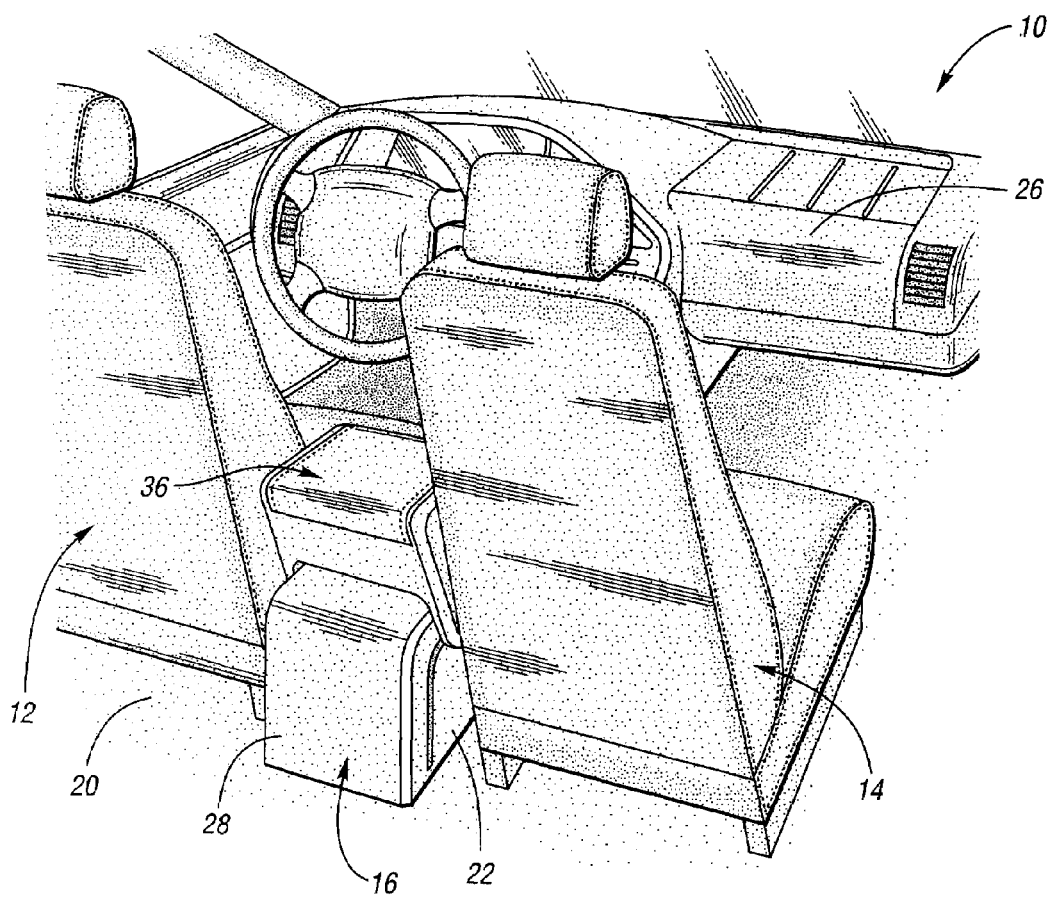
FIG. 1 is a perspective view of a passenger seating area of a vehicle having a console assembly in accordance with the present invention.

Referring now to the Figures, a console assembly for use in the passenger seating area 10 of a motor vehicle in accordance with the present invention is disclosed. It is understood that the console assembly may be a stand alone console disposed in the passenger seating area. Alternatively, the console assembly may be used in either the front or rear passenger seating areas. For purposes of this disclosure, the console assembly will be installed in the front passenger seating area.

In the following description, various operating parameters and components are described for a number of constructed embodiments. These specific parameters and components are included as examples and are not meant to be limiting.

In a preferred aspect of the present invention, console assembly 10 is disposed between a pair of passenger seats 12, 14 and includes a lower console module 16 having a base 18 configured for securement to the floor 20 of the passenger seating area of the vehicle. The base of console housing may also be connected to one or more vehicle seats. A pair of side surfaces 22 extend generally upward from base 18 and are preferably disposed adjacent the pair of passenger seats 12, 14. It is understood that the console housing may be positioned anywhere within the passenger seating area of the vehicle.

Figure 2:
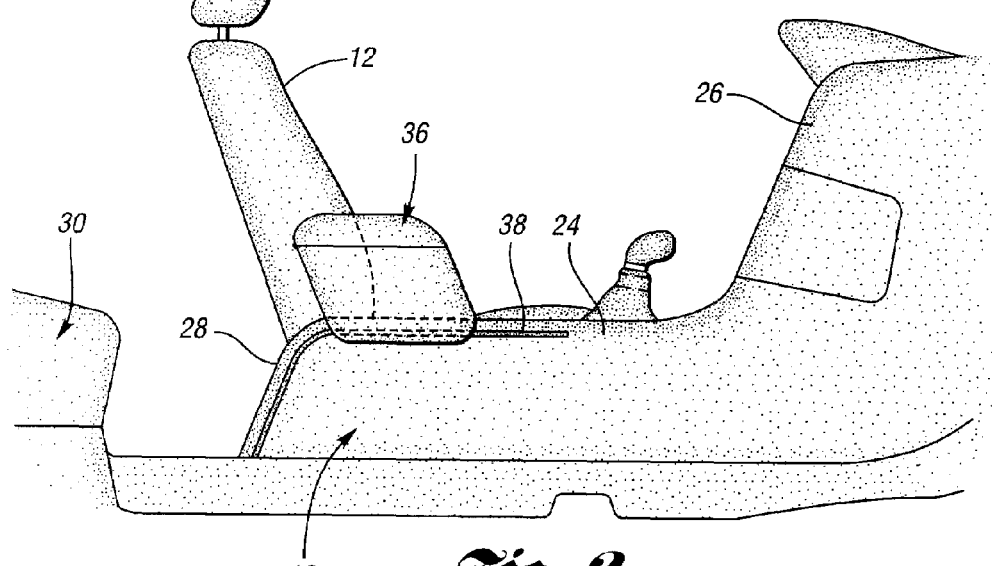
FIG. 2 is a side elevational view of the passenger seating area incorporating a console assembly in accordance with the present invention.

Referring additionally now to FIG. 2, lower console module 16 further includes a front surface 24 disposed generally adjacent a dashboard or instrument panel 26 or other forward portion of the vehicle and an opposing rear surface 28 that may be accessible by occupants in a rear passenger seating area 30 of the vehicle. It is understood that the front surface 24 of the lower console module may be configured to include one or more storage compartments or cavities adapted to receive and secure personal items.

Figure 5:
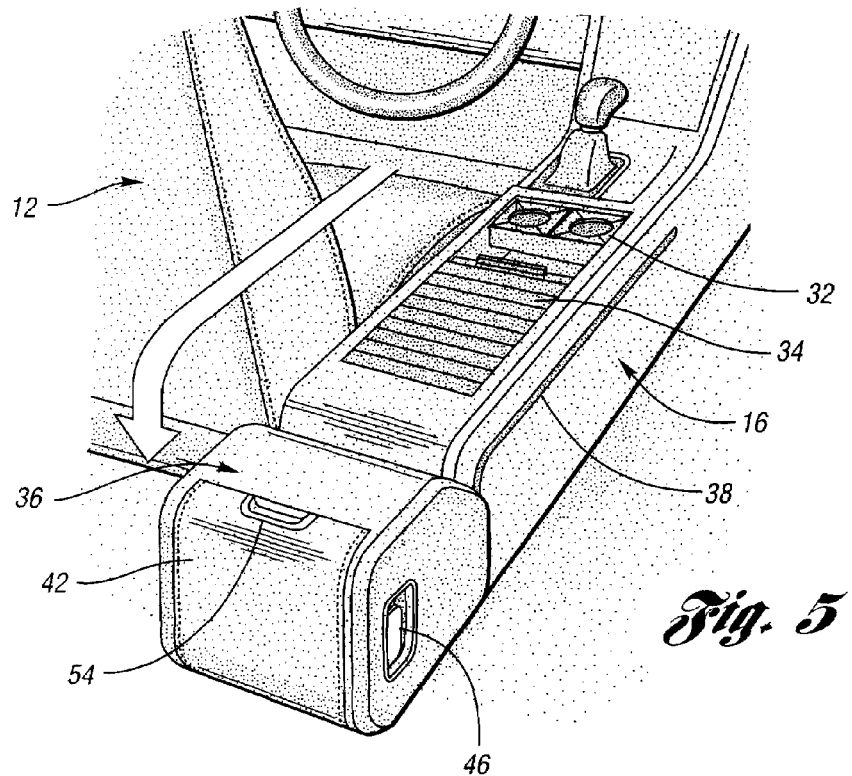
FIG. 5 is a rear perspective view of the passenger seating area with the upper console module moved to a rear position.
Figure 6:
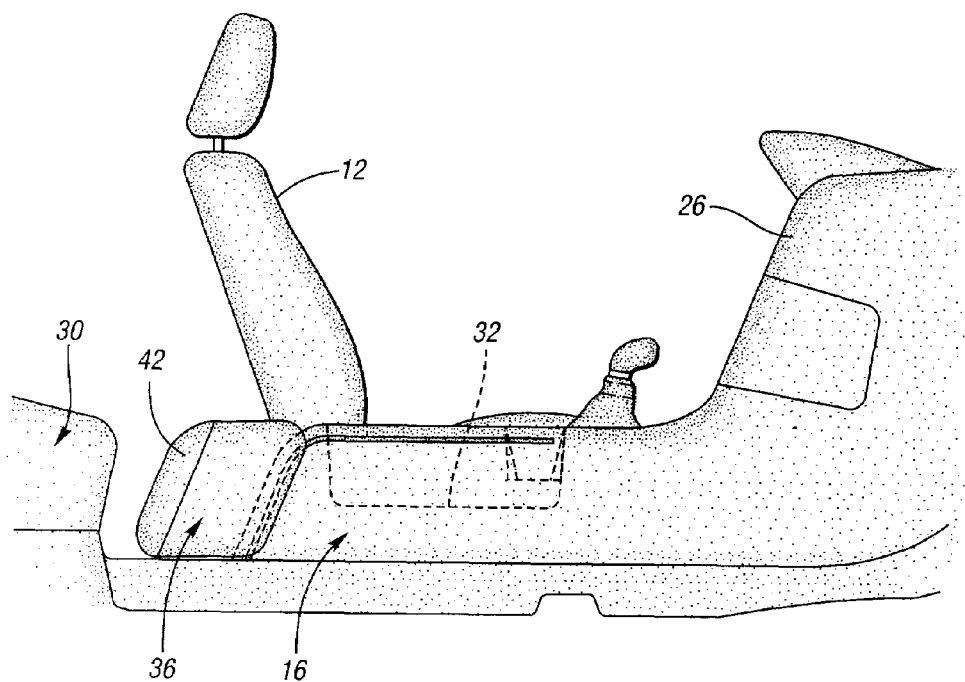
FIG. 6 is a side elevational view of the passenger seating area with the upper console module moved to a rear position.

As is shown in FIGS. 5 and 6, the lower console housing 16 may include one or more storage compartments 32. Storage compartments 32 may be formed into various geometries to accomplish a variety of function, such as storage bins or beverage container or cup holders. A door or cover 34 may be slidably mounted above the storage compartments 32 to at least partially cover compartments 32.

It is understood that the lower console module or housing may also include a floor or transmission tunnel having one or more storage compartments or recesses formed therein configured to receive and secure passenger personal items, such as purses, cell phones or sunglasses. It is also contemplated that vehicle components, such as garage door openers, media components and the like may be positioned within the lower console housing.

Referring back to FIGS. 1 and 2, console assembly 10 further comprises an upper console module 36 that is disposed adjacent and is operatively connected to the lower console module 16 between passenger seats 12, 14. As will be described in greater detail below, upper console module 36 is operatively connected to the lower console module 16 through openings or channels 38 provided in the side surfaces 22 of the lower console module 16. Console assembly 10 is configured to allow access to the upper console module 36 depending upon the position of module 36 by both front and rear seat occupants in the passenger seating area of the vehicle.

Figure 3:
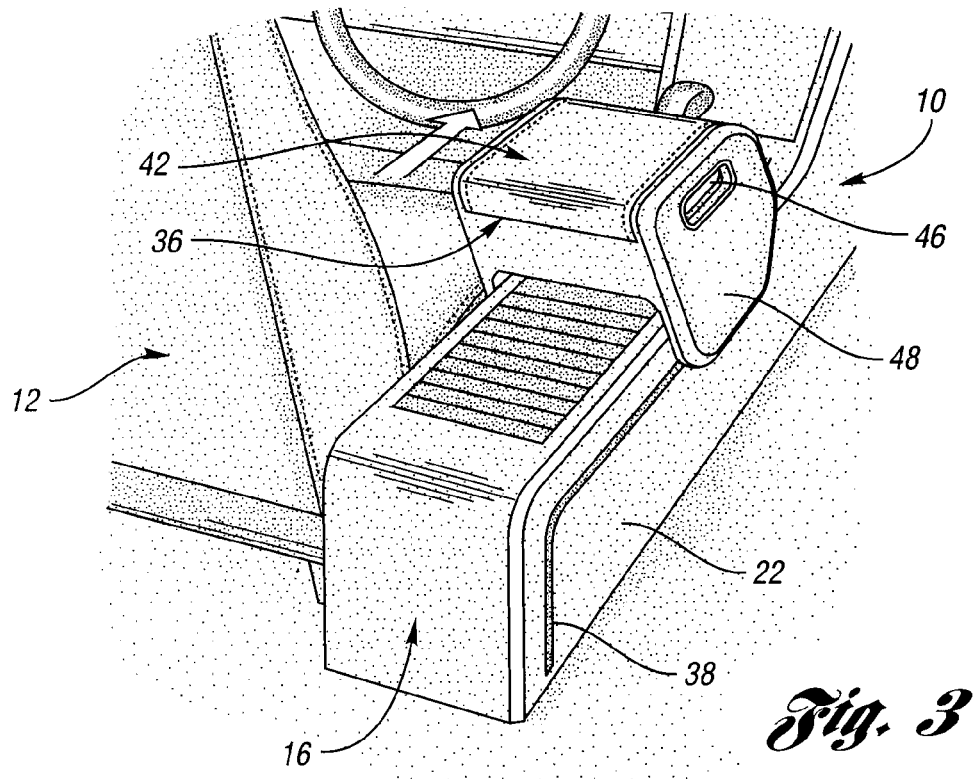
FIG. 3 is a rear perspective view of the passenger seating area with a upper console module placed in a forward position.
Figure 4:
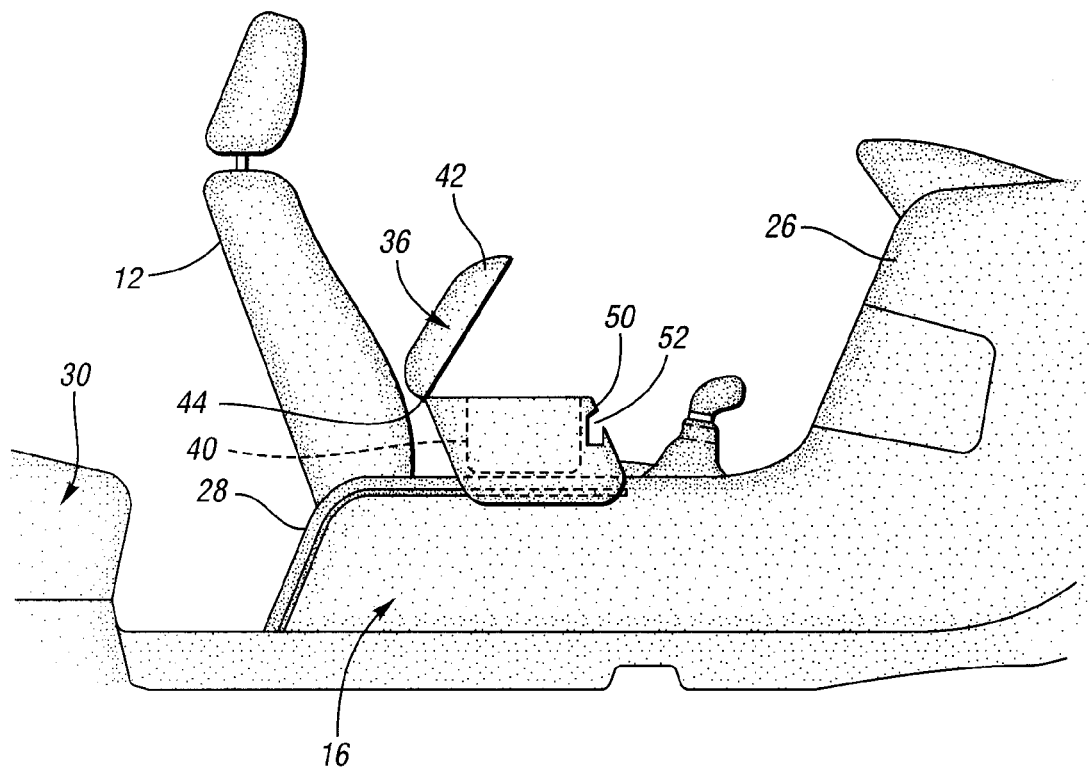
FIG. 4 is a side elevational view of the passenger seating area with the upper console module placed in a forward position.

Referring now to FIGS. 3 and 4, upper console module 36 may be formed as an armrest configured to support an occupant's appendage or one or more items thereon. In one aspect of the present invention, the armrest is covered with a standard seating material to coordinate with the seating area of vehicle. In another aspect of the present invention, a polymeric insert is placed on armrest. The polymeric insert may include molded recesses adapted to receive and store various items, including liquid containers, sunglasses and the like.

In another aspect of the present invention, upper console module 36 includes a storage cavity 40 disposed within the console module housing. An armrest 42 is pivotally connected to the module by a hinge 44. Armrest 42 cooperates with and extends at least partially over the storage cavity 40 in module 36. Armrest 42 is positionable between a stowed position disposed at least partially adjacent a top surface of the module 36 and storage cavity 40 and a deployed position extending away therefrom.

The upper console module 36 of the console assembly 10 of the present invention is shown in a forward deployed position in FIGS. 3 and 4. Upper console module 36 is translated forward from a position adjacent the front passenger seat 12 as shown in FIG. 2 to a position forward of the passenger seat 12. When the upper console module 36 is moved to a forward position, storage compartments provided in the lower console module 16 may be accessible to occupants in the rear passenger seating area of the vehicle.

In one aspect of the present invention, one or more handles 46 are provided on side surfaces 48 of the upper console module 36. Handles 46 allow occupants in the forward passenger seating area to move the upper console module 36 forward relative to the lower console module 16. In another aspect of the present invention shown in FIG. 4, a front surface 50 of upper console module 36 includes a projection 52 that is configured to allow a user to grip the front surface 50 to move the upper console module 36 forward relative to the lower console module 16.

It is also contemplated that the console assembly may include an electromechanical solution that assists in the movement of the upper console module relative to the lower console module. For example, one or more switches may be provided on the top and rear surfaces of the lower console module or other part of the vehicle which allow occupants of the front or rear passenger seating areas to activate a motor. Once activated, the motor would cause portions of the upper console module connected to one or more guide rails to translate the upper console module forward and rearward relative to the lower console module.

Upper console module 36 is operatively connected to the lower console module 16 by openings 38 extending through side surfaces 22 of the lower console module 16. In one aspect of the present invention, one or more guide rails cooperate with the openings in the side surfaces of the lower console module to receive portions of the upper console module which allow the upper console module to move along the one or more guide rails.

It is understood that the number and position of the guide rails and openings can be determined based on design and performance characteristics. For example, guide rails and openings may be provided on a top surface of the lower console module while performing the same functions. Further, it is contemplated that the guide rails may include stops which allow vehicle occupants to position the upper console module 36 in discrete positions relative to the lower console module 16. Alternatively, openings 38 may function to receive portions of the upper console module 36 and allow module 36 to move forward and rearward relative to the lower console module 16.

Referring now to FIGS. 5 and 6, lower console module 36 is shown in a rear deployed position adjacent a rear surface 28 of the lower console module 16. In this position, armrest 42 is positioned adjacent rear passenger seating area 30. An occupant of rear passenger seating area 30 may access items stored within storage cavity 40 if handle 54 armrest 42 is opened and pivoted away from upper console module 36.

Upper console module 36 is translated rearward from a position adjacent the front passenger seat 12 as shown in FIG. 2 to a position adjacent the rear passenger seating area 30 by adjusting upper console module 36 along openings 38 in lower console module 16. The upper console module 36 can be returned to a first position adjacent the top surface of the lower console module 16 by occupants in the rear passenger seating area 30 by grabbing handles 46 on the side surfaces of the upper console module 36.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A console assembly configured for use in a passenger seating area of a vehicle, the console assembly comprising:
   a lower console module extending generally horizontally adjacent a floor of the passenger seating area; and
   an upper console module disposed adjacent and operatively connected to the lower console module,
   wherein the upper console module is adjustable between one or more generally horizontal positions disposed adjacent a top surface of the lower console module and a generally vertical position disposed adjacent a rear surface of the lower console module.

2. The console assembly of claim 1 wherein the console assembly is disposed between a pair of passenger seats in the passenger seating area.

3. The console assembly of claim 2 wherein the console assembly is disposed between a pair of front passenger seats in the passenger seating area and is accessible to the rear passenger seating area.

4. The console assembly of claim 1 wherein the lower console module further comprises a base, a front surface, opposing side surfaces extending between the front and rear surfaces and an opening defined in the top surface.

5. The console assembly of claim 4 wherein the lower console module further comprises a storage area having one or more storage compartments accessible through the opening in the top surface.

6. The console assembly of claim 5 further comprising a beverage container holder formed into the one or more storage compartments.

7. The console assembly of claim 5 further comprising one or more doors disposed above the one or more storage compartments movable between an open position and a closed position at least partially covering the one or more storage compartments.

8. The console assembly of claim 1 wherein the upper console module further comprises an armrest pivotally connected to and extending at least partially over a storage compartment formed in the upper console module.

9. The console assembly of claim 1 wherein one or more handles are provided on an outer periphery of the upper console module.

10. The console assembly of claim 1 wherein the upper console module is operatively connected to the lower console module through one or more channels extending through the side surfaces of the lower console module.

11. A console assembly disposed between a pair of front passenger seats in a passenger seating area, the console assembly comprising:
 a lower console module extending generally horizontally between the pair of front passengers seats adjacent a floor of the passenger seating area, the lower console module having one or more storage compartments accessible through the opening in a top surface and one or more doors movable between an open position and a closed position at least partially covering the one or more storage compartments; and
 an upper console module disposed adjacent and operatively connected to the lower console module,
 wherein the upper console module is adjustable between one or more generally horizontal positions disposed adjacent a top surface of the lower console module and a generally vertical position disposed adjacent a rear surface of the lower console module.

12. The console assembly of claim 11 wherein the upper console module is accessible to the rear passenger seating area when moved to the generally vertical position.

13. The console assembly of claim 11 wherein the lower console module further comprises a base, a front surface, opposing side surfaces extending between the front and rear surfaces and an opening defined in the top surface.

14. The console assembly of claim 11 further comprising a beverage container holder formed into the one or more storage compartments in the lower console module.

15. The console assembly of claim 11 wherein the upper console module further comprises an armrest pivotally connected to and extending at least partially over a storage compartment formed in the upper console module.

16. The console assembly of claim 11 wherein one or more handles are provided on an outer periphery of the upper console module.

17. The console assembly of claim 11 wherein the upper console module is operatively connected to the lower console module through one or more channels extending through the side surfaces of the lower console module.

18. A console assembly disposed between a pair of front passenger seats adjacent a rear portion of a passenger seating area, the console assembly comprising:
 a lower console module extending generally horizontally between the pair of front passengers seats, the lower console module having a base securable to a floor of the passenger seating area, a front surface, a rear surface, opposing side surfaces extending between the front and rear surfaces having one or more channels formed therein and one or more storage compartments accessible through the opening in a top surface; and
 an upper console module disposed adjacent and operatively connected to the lower console module through the one or more channels in the lower console module, the upper console module having an armrest pivotally connected to and extending at least partially over a storage compartment formed in the upper console module,
 wherein the upper console module is adjustable between one or more generally horizontal positions disposed adjacent a top surface of the lower console module and a generally vertical position disposed adjacent a rear surface of the lower console module such that the upper console module is accessible to the rear passenger seating area when moved to the generally vertical position.

19. The console assembly of claim 18 wherein the lower console module includes one or more doors movable between an open position and a closed position at least partially covering the one or more storage compartments formed therein.

20. The console assembly of claim 18 wherein one or more handles are provided on an outer periphery of the upper console module.

* * * * *